Feb. 19, 1924.
F. STITZEL
SPRING WHEEL
Filed March 20, 1923
1,484,580
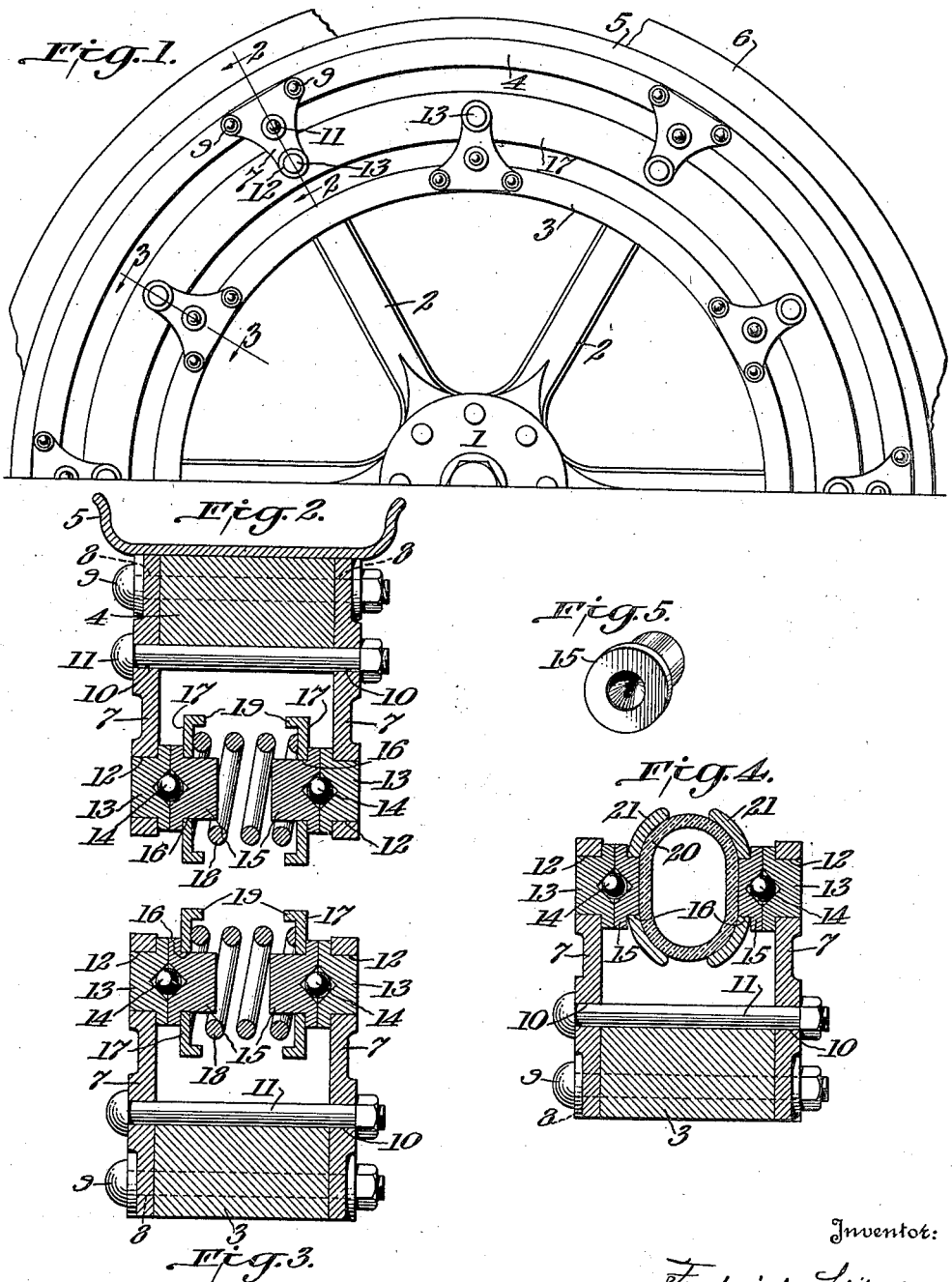
Inventor:
Frederick Stitzel
by
M. H. Finckel
Attorney.

Patented Feb. 19, 1924.

1,484,580

UNITED STATES PATENT OFFICE.

FREDERICK STITZEL, OF LOUISVILLE, KENTUCKY.

SPRING WHEEL.

Application filed March 20, 1923. Serial No. 626,301.

*To all whom it may concern:*

Be it known that I, FREDERICK STITZEL, a citizen of the United States, residing at Louisville, in the county of Jefferson and State of Kentucky, have invented a certain new and useful Improvement in Spring Wheels, of which the following is a full, clear, and exact description.

This invention relates to that class of spring wheels in which an outer member containing the tire is connected with an inner member containing the hub by yielding or spring elements that operate as a cushion to take up the pressure and shock imparted to the wheel in use, and the invention is in the nature of an improvement on the wheels of my Patent No. 1,085,641, granted February 3, 1914.

In the Patent No. 1,085,641, the hangers are of a more or less flexible, resilient or elastic nature and permit excessive side movement, and when they are made heavier their flexing is deficient. In the present invention the hangers are made rigid and similar hangers are used on both the outer and the inner members of the wheel and engage non-giving or rigid rings interposed between the inner and outer members and supported by the hangers, so that when the inner member sinks it serves to press all of the units alike, the balls in the upper units moving toward the upper edges of the cones and the balls in the lower units moving toward the lower edges of the cones, thus causing the rings to be pressed centrally.

In the preferred construction, the connecting units between the inner and outer wheel members are arranged in staggered pairs on opposite sides, but the invention is not thus limited.

The invention consists of hangers of like construction and substantially rigid nature, carrying ball and cone bearings and applied to the inner and outer wheel members, the cones supporting bodily movable rings of rigid material, arranged between the inner and outer wheel members, and between these rings are mounted yielding members, such as coiled springs or an air or equivalent cushion, as I will proceed now to explain more fully and finally claim.

In the accompanying drawings illustrating the invention, in the several figures of which like parts are similarly designated, Figure 1 is a side elevation of half of a spring wheel for use on motor or other vehicles. Fig. 2 is a cross section on a larger scale taken in the plane of line 2—2, Fig. 1, and Fig. 3 is a cross section on a larger scale taken in the plane of line 3—3, Fig. 1, Figs. 2 and 3 illustrating the invention as using coiled springs as the resilient or cushioning medium. Fig. 4 is a cross section, also on a larger scale, and similar to Fig. 3 illustrating the invention used in connection with a pneumatic cushion. Fig. 5 is a perspective view of one of the cones detached.

The hub 1, spokes 2 and rim or felly 3 of the inner wheel or member may be of any usual or approved construction, and so also may be the rim or felly 4 of the outer member and the rim 5 and the tire 6 thereof, the last-mentioned rim and the tire being shown in a purely conventional manner.

The hangers 7 which are used on the outer wheel member and the inner are alike and the description of one will suffice for all. The hanger is of conventional triangular shape, made rigid throughout, and produced by casting or any other suitable process. The base of the hanger is provided with the bolt holes 8 to receive bolts or rivets or other suitable fastening means 9 to secure it rigidly to the felly or other part of the wheel. 10 is an intermediate hole to receive a bolt, rivet or other fastening medium 11. The apex of the triangular structure is provided with a hole 12.

These hangers are arranged in pairs on opposite sides of the rims and the bolts 9 and 11 are passed transversely through the hangers of a pair in order to attach them to the rim or felly of the wheel and to stay or strengthen them between their ends where they are unsupported directly by the rim or felly or other portion of the wheel.

Pairs of hangers are arranged, preferably alternately, on the outer wheel member or its felly with their apexes pointing toward the hub of the wheel and the other pairs are arranged on the inner member of the wheel or its felly with their apexes pointing towards the tire.

Each of these pairs of hangers constitutes what is herein referred to as a unit, and each unit is complete in itself.

The holes 12 in the hangers serve to receive the shanks 13 of the flanged cones 14, and complemental shanked and flanged cones 15 are mounted in holes 16 in the rings 17, the shanks of the cones 15 extending inwardly to receive and support coiled springs or other suitable elastic or yielding or spring devices 18 interposed horizontally between the rings 17.

As will be noticed, the rings 17 have rim flanges 19 to reinforce them and also to aid in holding the springs in place. These rings are substantially rigid or non-giving.

Instead of using coiled springs, they may be replaced by an annular pneumatic tube or air cushion 20 shown in Fig. 4. This device may be inflated or deflated in any usual or approved way, and it constitutes the spring element of the wheel, and it is of sufficient strength to absorb all shocks incident to the use of such wheels and affords a cushioned wheel of efficient and durable quality, as stated in the specification of my application for patent for spring wheels, filed October 13, 1922, Serial No. 594,287.

As already stated, these hangers may be and preferably are arranged staggering; that is to say, the hangers on the outer wheel member alternate with hangers on the inner wheel member.

The cones are placed in the hangers and the rings, and the inner cones extend beyond the rings to form spring rests. Of course, in the case of the pneumatic tube, the shanks of the inner cones extend through holes in the rings and not into the air cushion itself. By having the inner cones flush with the inner side of the rings, the rubber tubes may be used without fear of being damaged.

Referring to Fig. 4, it will be noticed that the rings have their rims 21 inclined toward one another instead of being angularly flanged, but in this case as in the construction shown in Figs. 2 and 3, the construction of the rings is such as to ensure the retention and stability of the interposed cushioning member, whether such cushioning member be metallic springs or a pneumatic tube.

When the wheel is in use, the inner member sinks or yields under pressure, and as it does so, it presses all of the units alike. When under such pressure the balls on the upper units move toward the upper edges of the cones, and the balls in the lower units move toward the lower edges of the cones, and thus the rings are pressed centrally.

Each pair of hangers, that is to say, each supporting unit, is independent of the next adjacent pairs; or in other words, each unit is self-contained and merely contributes to the effect of the other units in the support and positioning of the cushioning member without immediate coactive relation with the other units.

It will be noticed that the construction is very simple and the operation positive and efficient.

By the terms "resilience" and "medium" herein used I mean to include not only the metal springs but also the air cushion or their equivalents.

While I have shown each of the ring members as continuous, it is to be understood, of course, that the invention is not limited to this detail, and other variations in details of construction and arrangement of parts are permissible within the spirit and scope of the invention and the claims following.

What I claim is:—

1. A spring wheel, having an inner member and an outer member, rigid hangers extending outwardly from the inner member and toward the outer member, and similar rigid hangers extending inwardly from the outer member toward the inner member, these hangers being arranged in pairs and rigidly connected with their respective members, and a resilient member interposed between and supported by the hangers and comprising continuous ring members and interposed resilience.

2. A spring wheel, having an inner member and an outer member, rigid hangers extending outwardly from the inner member and toward the outer member, and similar rigid hangers extending inwardly from the outer member toward the inner member, these hangers being arranged in pairs, and the pairs of hangers rigidly connected with their respective wheel members and the hangers of each pair additionally rigidly connected with one another, and a resilience interposed between and supported by these hangers.

3. A spring wheel, comprising an inner member and an outer member, the inner member having outwardly projecting hangers and the outer member having inwardly projecting hangers arranged in pairs and staggered, the hangers being of rigid construction and rigidly connected to their respective wheel members, rigid rings engaged and supported by the hangers and a cushioning medium interposed between the said rings.

In testimony whereof I have hereunto set my hand this 17th day of March, A. D. 1923.

FREDERICK STITZEL.

Witnesses:
FREDERIC C. LORD,
MARIE MONTGOMERY.